United States Patent
Cheikh et al.

(10) Patent No.: US 9,601,941 B2
(45) Date of Patent: Mar. 21, 2017

(54) CHARGING DEVICE AND METHOD USING DUAL-MODE MAGNETIC COUPLING FOR AN AUTOMOBILE VEHICLE

(71) Applicants: Mohamed Cheikh, Toulouse (FR);
Sebastien Kessler, Dremil-Lafage (FR);
Said Bouguern, Blagnac (FR)

(72) Inventors: Mohamed Cheikh, Toulouse (FR);
Sebastien Kessler, Dremil-Lafage (FR);
Said Bouguern, Blagnac (FR)

(73) Assignees: CONTINENTAL AUTOMOTIVE FRANCE, Toulouse (FR);
CONTINENTAL AUTOMOTIVE GMBH, Hannover (DE)

(*) Notice: Subject to any disclaimer, the term of this patent is extended or adjusted under 35 U.S.C. 154(b) by 281 days.

(21) Appl. No.: 14/464,075

(22) Filed: Aug. 20, 2014

(65) Prior Publication Data

US 2015/0061586 A1  Mar. 5, 2015

(30) Foreign Application Priority Data

Aug. 30, 2013  (FR) ..................................... 13 58311

(51) Int. Cl.
*H02J 7/00* (2006.01)
*H02J 7/02* (2016.01)
(Continued)

(52) U.S. Cl.
CPC ............. *H02J 7/025* (2013.01); *B60L 11/182* (2013.01); *H02J 5/005* (2013.01); *H02J 7/007* (2013.01);
(Continued)

(58) Field of Classification Search
USPC .................. 320/107, 108, 114, 137
See application file for complete search history.

(56) References Cited

U.S. PATENT DOCUMENTS 8,559,659 B2 * 10/2013 Chu .................... H04M 1/6041
320/114
2004/0113790 A1  6/2004 Hamel et al.
(Continued)

FOREIGN PATENT DOCUMENTS

KR  2013 0024757  3/2013

OTHER PUBLICATIONS

French Search Report dated May 19, 2014, corresponding to the Foreign Priority Application No. 1358311.
(Continued)

*Primary Examiner* — Brian Ngo
(74) *Attorney, Agent, or Firm* — Young & Thompson

(57) ABSTRACT

A device (10) for charging a mobile terminal by magnetic coupling, includes a first charging module (11) designed to form a charging signal at a first charging frequency, a primary coil (13) composed of a set of turns, a ferromagnetic body (14), a second charging module (12) designed to form a charging signal at a second charging frequency, higher than the first charging frequency. Furthermore, the charging device includes first routing elements (150) designed to connect/disconnect the primary coil (13) to/from the first charging module (11) and to/from the second charging module (12), elements (16) for adjusting the number of turns on the primary coil (13) and elements (19) for saturating the ferromagnetic body (14) at the second charging frequency. A charging method is also described.

16 Claims, 1 Drawing Sheet

Figure 1:
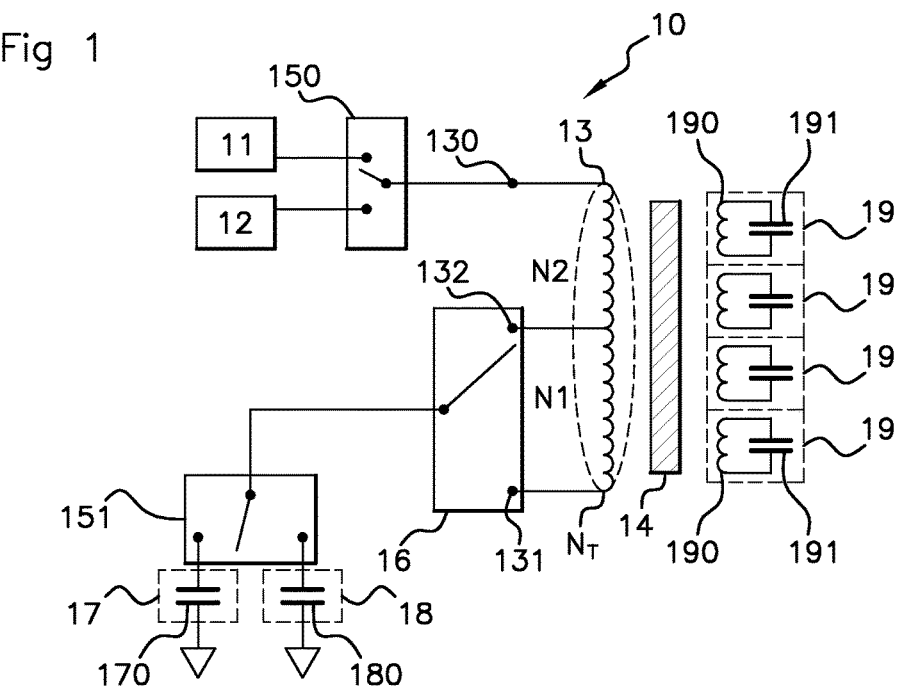

(51) Int. Cl.
*H02J 5/00* (2016.01)
*B60L 11/18* (2006.01)
*H02J 17/00* (2006.01)
*H01F 38/14* (2006.01)

(52) U.S. Cl.
CPC .............. *H02J 17/00* (2013.01); *H01F 38/14* (2013.01); *H02J 7/0042* (2013.01)

(56) References Cited

U.S. PATENT DOCUMENTS

| | | | |
|---|---|---|---|
| 2010/0115474 A1* | 5/2010 | Takada | G06F 17/5063 716/133 |
| 2012/0025623 A1 | 2/2012 | Low et al. | |
| 2012/0235636 A1* | 9/2012 | Partovi | H02J 7/025 320/108 |
| 2013/0307468 A1* | 11/2013 | Lee | H02J 7/0052 320/108 |
| 2014/0191713 A1* | 7/2014 | Hong | H02J 7/0029 320/108 |
| 2014/0210406 A1 | 7/2014 | Na et al. | |
| 2015/0137746 A1* | 5/2015 | Lee | H02J 5/005 320/108 |

OTHER PUBLICATIONS

Hiroki Shoki, et al.; "Issues and Initiatives for Practical Deployment of Wireless Power Transfer Technologies in Japan"; vol. 101, No. 6; Jun. 1, 2013; pp. 1312-1320.

\* cited by examiner

CHARGING DEVICE AND METHOD USING DUAL-MODE MAGNETIC COUPLING FOR AN AUTOMOBILE VEHICLE

BACKGROUND OF THE INVENTION

The present invention relates to a device and a method for charging a mobile terminal by magnetic coupling. The present invention has one particularly advantageous application, although this is in no way limiting, in the charging devices installed onboard automobile vehicles.

DESCRIPTION OF THE RELATED ART

Charging devices using magnetic coupling, enabling mobile terminals (mobile telephones, laptops, touchscreen tablets, digital cameras, etc.) to be charged wirelessly, are becoming increasingly widespread.

Conventionally, a charging device using magnetic coupling comprises a conducting coil, known as the "primary coil", which is connected to a charging module. When charging a mobile terminal, the charging module forms a charging signal which makes an electrical current flow in the primary coil whose intensity varies with time. The primary coil thus powered generates a variable magnetic field.

The mobile terminal comprises a receiver module comprising a conducting coil, known as "secondary coil". When said secondary coil is placed in the variable magnetic field formed by the primary coil, an electrical current is induced in said secondary coil. This electrical current allows an electrical accumulator connected to the secondary coil to be charged thus supplying current to the mobile terminal.

Several types of charging devices using magnetic coupling are known operating according to the general principle described hereinbefore, notably those defined by:
- the WPC (Wireless Power Consortium) consortium, which defines charging devices referred to as "magnetic induction" devices, which use a charging frequency in principle in the range between 100 and 200 kiloHertz (kHz),
- the A4WP (acronym for "Alliance for Wireless Power") consortium, which defines charging devices referred to as "magnetic resonance" devices, which use a charging frequency in principle in the range between 6 and 7 MegaHertz (MHz).

In order to provide interoperability with all mobile terminals, there presently exists a need for charging devices using dual-mode magnetic coupling, in other words compatible with both the requirements defined by the WPC consortium and with the requirements defined by the A4WP consortium.

However, the requirements compatible with needs of the WPC and A4WP consortia (for the sake of simplicity, in the following part, they will be referred to as WPC primary coil and A4WP primary coil) have very different characteristics. Notably, the WPC primary coils are generally associated with a ferromagnetic body which can interfere with the operation of the A4WP primary coils, such that the WPC and A4WP primary coils cannot easily be co-localized. The WPC and A4WP charging surfaces must then be separated, and there consequently exists a constraint on the positioning of the mobile terminal depending on whether it is equipped with a WPC or A4WP receiver module.

SUMMARY OF THE INVENTION

The aim of the present invention is to overcome all or part of the limitations of the solutions of the prior art, notably those presented hereinbefore, by providing a solution which allows dual-mode charging devices using magnetic coupling to be obtained having a single charging surface for the WPC and A4WP charging modules.

For this purpose, and according to a first aspect, the invention relates to a device for charging a mobile terminal by magnetic coupling, comprising a first charging module designed to form a charging signal at a first charging frequency, a primary coil composed of a set of turns, a ferromagnetic body associated with said primary coil, a second charging module designed to former a charging signal at a second charging frequency, higher than the first charging frequency. Furthermore, the charging device comprises:
- first routing means designed to connect/disconnect the primary coil to/from the first charging module and to/from the second charging module,
- means for adjusting the number of turns on the primary coil designed to activate/disable a sub-set of de-activatable turns on the primary coil,
- means for saturating the ferromagnetic body designed to reduce, within said ferromagnetic body, the magnetic field formed by the primary coil when said primary coil is connected to the second charging module.

Thanks to first routing means, the primary coil is shared between the first charging module and the second charging module, in such a manner that it is possible to charge the mobile terminal on the same charging surface.

The ferromagnetic body allows the efficiency of the charging by the first charging module, whose charging frequency is the lower, to be improved. However, the presence of the ferromagnetic body can decrease the efficiency of the charging by the second charging module, whose charging frequency is the higher. Thanks to the saturation means, the interference induced by the ferromagnetic body is reduced and the charging by the second charging module can be implemented even in the presence of the ferromagnetic body.

Furthermore, the means for adjusting the number of turns allow the number of turns to be adapted according to the charging module used, and hence according to the charging frequency used.

In particular embodiments, the charging device may furthermore comprise one or more of the following features, taken alone or according to all the technically possible combinations.

In one particular embodiment, the saturation means comprise passive resonator circuits arranged, with respect to the ferromagnetic body, on the opposite side from the primary coil.

In one particular embodiment, each passive resonator circuit is formed by a saturation coil and a capacitor.

In one particular embodiment, the passive resonator circuits are arranged so as to cover an entire surface of the ferromagnetic body.

In one particular embodiment, the charging device comprises a first circuit for matching the resonance frequency of the primary coil to the first charging frequency, and a second circuit for matching the resonance frequency of the primary coil to the second charging frequency, and second routing means, the second routing means being furthermore designed to connect/disconnect the primary coil to/from the first matching circuit and to/from the second matching circuit.

According to a second aspect, the invention relates to an automobile vehicle comprising a charging device according to the invention.

According to a third aspect, the invention relates to a method for charging a mobile terminal by magnetic coupling by means of a charging device according to the invention, in which:

when the mobile terminal is to be charged at a first charging frequency, the primary coil is connected to the first charging module and the de-activatable sub-set of turns on said primary coil is activated, when the mobile terminal is to be charged at a second charging frequency, the primary coil is connected to the second charging module and the de-activatable sub-set of turns on said primary coil is disabled.

In particular embodiments, the charging process may furthermore comprise one or more of the following features, taken alone or according to all the technically possible combinations.

In one particular embodiment:

when the mobile terminal is to be charged at a first charging frequency, the primary coil is connected to a first circuit for matching the resonance frequency of said primary coil to the first charging frequency, when the mobile terminal is to be charged at a second charging frequency, the primary coil is connected to a second circuit for matching the resonance frequency of the primary coil to the second charging frequency.

In one particular embodiment, the search for the presence of a mobile terminal to be charged is carried out by means of the primary coil connected to the second charging module.

BRIEF DESCRIPTION OF THE DRAWING FIGURES

Figure 2:
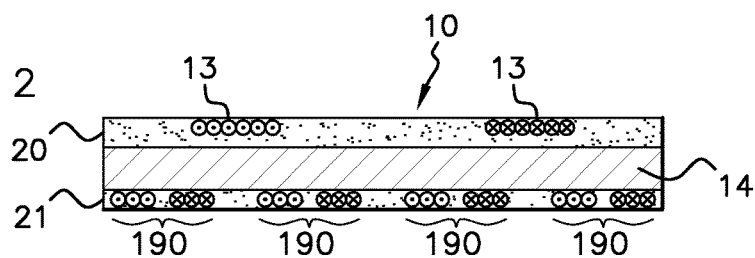
Figure 3:
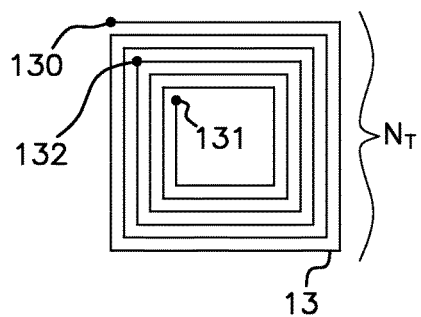
Figure 4:
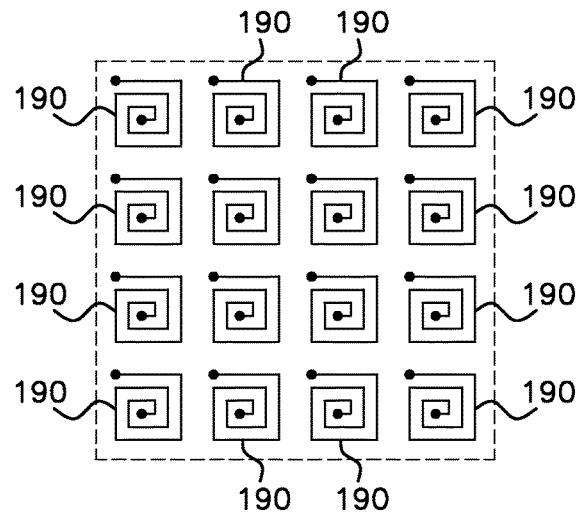

The invention will be better understood upon reading the following description, given by way of non-limiting example, and presented with reference to the figures which show:

FIG. 1: a schematic diagram of one exemplary embodiment of a charging device,

FIGS. 2, 3 and 4: different partial views of one preferred embodiment of the charging device in FIG. 1.

DETAILED DESCRIPTION OF THE INVENTION

In these figures, identical references from one figure to another denote identical or analogous elements. For reasons of clarity, the elements shown are not to scale, except where specifically stated.

FIG. 1 shows schematically one exemplary embodiment of a device 10 for charging a mobile terminal by magnetic coupling.

The charging device 10 is for example installed onboard an automobile vehicle (not shown). The mobile terminal (not shown) is for example a mobile telephone, a laptop, a touchscreen tablet, a digital camera, etc.

The charging device 10 comprises a first charging module 11 designed to form a charging signal at a first charging frequency F1. In the following part of the description, the non-limiting case is considered where the first charging module 11 is a WPC charging module 11, the first charging frequency F1 being in the range between 100 and 200 kHz.

The charging device 10 also comprises at least one primary coil 13, associated with the WPC charging module 11, composed of a set of $N_T$ turns. In order to optimize the charging at the first charging frequency F1, the charging device 10 also comprises a ferromagnetic body, for example a ferrite 14, whose magnetic properties are optimized for an operation at the first charging frequency F1. In other words, at the first charging frequency F1, the ferrite 14 behaves as a mirror with respect to the magnetic field formed by the primary coil 13 connected to the WPC charging module 11.

The device 10 for charging by magnetic coupling is a dual-mode device, in other words designed to charge a mobile terminal at two different charging frequencies. For this purpose, the charging device 10 comprises a second charging module 12 designed to form a charging signal at a second charging frequency F2, higher than the first charging frequency F1. In the following part of the description, the non-limiting case is considered where the second charging module 12 is an A4WP charging module 12, the second charging frequency F2 being in the range between 6 and 7 MHz.

Furthermore, and according to the invention, the primary coil 13 is also used in the case of charging at the second charging frequency F2.

For this purpose, the charging device 10 comprises first routing means 150 designed to connect/disconnect the primary coil 13 to/from the WPC charging module 11, and connect/disconnect the primary coil 13 to/from the A4WP charging module 12.

In the non-limiting example illustrated in FIG. 1, the first routing means notably comprise, for this purpose, a selector circuit 150 designed to connect the primary coil 13 to either the WPC charging module 11 or to the A4WP charging module 12. Said selector circuit 150 is such that, when the primary coil 13 is connected to the WPC charging module 11 (respectively to the A4WP charging module 12), said primary coil is simultaneously disconnected from the A4WP charging module 12 (respectively from the WPC charging module 11).

The charging device 10 illustrated in FIG. 1 also comprises means 16 for adjusting the number of turns on the primary coil 13, depending on whether said primary coil 13 is connected to the WPC charging module 11 or to the A4WP charging module 12.

Indeed, the number of turns required for the primary coil 13, recommended by the WPC consortium, is different from that recommended by the A4WP consortium, taking into account the respective values of the first and second charging frequencies F1 and F2. More particularly, the number of turns defined by the WPC consortium is greater than that defined by the A4WP consortium.

As a consequence, the number $N_T$ of turns on the primary coil 13 is chosen to be adapted for an operation in association with the WPC charging module 11. The $N_T$ turns on the primary coil 13 is divided into two complementary sub-sets of turns:

a first sub-set comprising N1 turns (the N1 turns being de-activatable), a second sub-set comprising N2 turns.

The number N2 of turns on the second sub-set is chosen to be adapted for an operation in association with the A4WP charging module 12, and the means 16 for adjusting the number of turns are designed to activate/disable the N1 turns on the first sub-set of the primary coil 13. In other words, the means 16 for adjusting the number of turns allow the operation to switch from N2 turns for the A4WP charging module 12 to $N_T$ turns for an operation with the WPC charging module 11, and vice versa.

In the non-limiting example illustrated in FIG. 1, the means for adjusting the number of turns notably comprise, for this purpose, a selector circuit 16 designed to connect any components downstream of the primary coil 13 to two different outputs of the primary coil 13:
- a first output 131 arranged, with respect to an input 130 of the primary coil 13, in such a manner that all of the $N_T$ turns on the primary coil 13 are activated,
- a second output 132 arranged, with respect to the input 130, in such a manner that only the N2 turns of the second sub-set of the primary coil 13 are activated, the N1 turns of the first sub-set then being disabled.

FIG. 1 shows one particular embodiment, in which the charging device 10 furthermore comprises:
- a first circuit 17 for matching the resonance frequency of the primary coil 13, all the $N_T$ turns being activated, to the first charging frequency F1,
- a second circuit 18 for matching the resonance frequency of the primary coil 13, the N1 turns of the first sub-set being disabled, to the second charging frequency F2.

The phrase "matching the resonance frequency to the first charging frequency F1 " (respectively the second charging frequency F2) is understood to mean that the resonance frequency of the assembly formed by the first matching circuit 17 (respectively the second matching circuit 18) and the primary coil 13 is equal or close to said first charging frequency F1 (respectively said second charging frequency F2). The phrase "close to the charging frequency" (first charging frequency F1 or second charging frequency F2) is for example understood to mean that said resonance frequency is separated from the charging frequency by less than 10% of said charging frequency.

In the non-limiting example illustrated in FIG. 1, the first matching circuit 17 and the second matching circuit 18 each comprise a capacitor, respectively 170 and 180, with a value designed to match the resonance frequency of the primary coil 13 respectively to the first charging frequency F1 and to the second charging frequency F2. There is no reason why, according to other examples not detailed here, other components could not be included.

Furthermore, second routing means 151 are designed to connect/disconnect the primary coil 13 to/from the first matching circuit 17, and to connect/disconnect said primary coil 13 to/from the second matching circuit 18.

In the non-limiting example illustrated in FIG. 1, said second routing means 151 comprise, for this purpose, a selector circuit 151 for the resonance frequency matching circuit, designed to connect the output of the primary coil 13 (which is, by virtue of the means 16 for adjusting the number of turns, either the first output 131 or the second output 132) to either the first matching circuit 17 or to the second matching circuit 18.

The charging device 10 also comprises means 19 for saturating the ferrite 14 designed to reduce, within said ferrite 14, the magnetic field formed by the primary coil 13 when said primary coil is connected to the A4WP charging module 12.

Indeed, the ferrite 14 is needed in the case of charging by magnetic induction (WPC) in order to improve the efficiency of the charging process, and notably the range of the charging device. The ferrite 14 is no longer required in the case of charging by magnetic resonance (A4WP) and, on the contrary, its presence could generating interference effects. By saturating the ferrite 14, its magnetic properties tend to be suppressed, as are the potential interference effects generated during charging of the mobile terminal by means of the A4WP charging module 12.

FIG. 1 shows one preferred embodiment of the charging device 10, in which the saturation means 19 comprise passive resonator circuits 19 with a resonance frequency close to the second charging frequency F2. The passive resonator circuits 19 are furthermore arranged, with respect to the ferrite 14, on the opposite side from the primary coil 13, preferably in contact with said ferrite 14. When the passive resonator circuits 19 and the primary coil 13 are close and, as a consequence, exhibit a strong coupling between them, the latter are advantageously configured such that the assembly formed by said passive resonator circuits 19 and said primary coil 13 has a resonance frequency equal to the second charging frequency F2.

In the example illustrated in FIG. 1, each passive resonator circuit 19 is formed by a saturation coil 190 and a capacitor 191.

When the primary coil 13 is connected to the A4WP charging module 12 (the N1 turns of the first sub-set being disabled), a variable magnetic field is created on either side of said primary coil 13. The ferrite 14, optimized for an operation at the first charging frequency F1, allows a part of the magnetic field through which generates induced currents in the saturation coils 190. The flow of these induced currents in the saturation coils 190 also creates a magnetic field that tends to oppose the magnetic field formed by the primary coil 13, and hence tends to saturate the ferrite 14. By adapting the characteristics of the saturation coils 190 and of the capacitors 191, it is furthermore possible to render the magnetic field formed by said saturation coils 190 negligible beyond the ferrite 14, in order for it not to interfere with the charging of the mobile terminal.

FIGS. 2, 3 and 4 show partial views of one preferred embodiment of the charging device 10 in FIG. 1, in which the primary coil 13 and the saturation coils 190 are fabricated in the form of respective printed circuit tracks 20 and 21.

FIG. 2 shows a cross-sectional view of said integrated circuits 20 and 21, between which the ferrite 14 is arranged.

FIG. 3 shows a top view of the integrated circuits 20, 21, from the side of the primary coil 13. Such as illustrated in FIG. 3, the input 130 of the primary coil 13, designed to be connected to the WPC charging module 11 or to the A4WP charging module 12, and the second output 132 are arranged in such a manner that the N2 turns of the second sub-set of the primary coil 13 correspond to the largest turns. Such dispositions allow the performance of the charging by means of the A4WP charging module 12 to be improved.

FIG. 4 shows a top view of the integrated circuits 20, 21, on the side of the saturation coils 190. In FIG. 4, the outline of the ferrite 14 is also shown as dashed lines. As illustrated in FIG. 4, said saturation coils 190 are advantageously arranged so as to cover the whole surface of the ferrite 14, in order to improve the saturation of said ferrite 14 at the second charging frequency F2.

The present invention also relates to a method for charging a mobile terminal by magnetic coupling by means of a charging device 10 such as illustrated in FIG. 1. The various steps of the charging method are for example executed by means of a control module (not shown), which notably controls the first and second routing means 151 and the means 16 for adjusting the number of turns on the primary coil 13.

Generally speaking, when the mobile terminal is to be charged at the first charging frequency F1, the control module commands the first routing means 150 so as to connect the primary coil 13 to the WPC charging module 11, and the means 16 for adjusting the number of turns so as to activate the N1 turns of the first sub-set of the primary coil 13. When the mobile terminal is to be charged at the second charging frequency F2, the control module commands the first routing means 150 so as to connect the primary coil 13 to the A4WP charging module 12, and the means 16 for adjusting the number of turns so as to disable the Ni turns of the first sub-set of the primary coil 13.

In the case of the charging device 10 in FIG. 1, which comprises a first matching circuit 17 and a second matching circuit 18:

when the mobile terminal is to be charged at the first charging frequency F1, the control module commands the second routing means 151 so as to connect the primary coil 13 to the first matching circuit 17, when the mobile terminal is to be charged at the second charging frequency F2, the control module commands the second routing means 151 so as to connect the primary coil 13 to the second matching circuit 18.

In one preferred embodiment, the charging method uses by default the A4WP charging module 12 in order to search for the presence of a mobile terminal near to a charging surface of the charging device 10.

Such dispositions are advantageous owing to the fact that the devices for charging by magnetic resonance have a longer range than the charging devices using magnetic induction. The presence of a mobile terminal near to the charging surface of the charging device 10 will interfere with the magnetic field generated by the primary coil 13 whatever the type of receiver module installed onboard said mobile terminal (WPC or A4WP). This interference will be able to be detected and considered as induced by the presence of a mobile terminal near to the charging surface. The charging device 10 will then be able to determine whether the mobile terminal detected is equipped with a WPC or A4WP receiver module, by successively activating the WPC charging module 11 and the A4WP charging module 12.

Generally speaking, it should be noted that the embodiments considered hereinabove have been described by way of non-limiting examples, and that consequently others variants may be envisioned.

Notably, the invention has been described by considering saturation means formed by passive resonator circuits. There is no reason why, according to other examples, other types of means may not be used for saturating the ferromagnetic body 14, including active saturation means.

The invention claimed is:

1. A device (10) for charging a mobile terminal by magnetic coupling, said device (10) comprising:
   a first charging module (11) designed to form a charging signal at a first charging frequency (F1),
   a primary coil (13) composed of a set of turns,
   a ferromagnetic body (14), the ferromagnetic body optimized for an operation at the first charging frequency F1,
   a second charging module (12) designed to form a charging signal at a second charging frequency (F2), the second charging frequency (F2) being higher than the first charging frequency (F1),
   first routing selector circuit (150) means designed to connect/disconnect the primary coil (13) to/from the first charging module (11) and to/from the second charging module (12),
   selector circuit (16) means for adjusting the number of turns ($N_T$, N2) of the primary coil (13) designed to activate/disable a de-activatable sub-set of turns (N1) of the primary coil (13) depending on whether i) said primary coil (13) is connected to the first charging module (11) or ii) said primary coil (13) is connected to the second charging module (12), the number of turns on the primary coil (13) being chosen to be adapted for an operation in association with the first charging module (11) and being divided into two complementary sub-sets of turns:
      i) a first sub-set comprising (N1) turns that are de-activatable,
      ii) a second sub-set comprising (N2) turns, being chosen to be adapted for an operation in association with the second charging module (12), and
   passive resonator circuits (19) means for saturating the ferromagnetic body (14), the passive resonator circuits (19) means comprising passive resonator circuits (19) with a resonance frequency close to the second charging frequency (F2) and arranged, with respect to the ferromagnetic body (14), on an opposite side from the primary coil (13), and designed to reduce, within said ferromagnetic body (14), the magnetic field formed by the primary coil (13) when said primary coil (13) is connected to the second charging module (12).

2. The device (10) as claimed in claim 1, wherein each passive resonator circuit (19) is formed by a saturation coil (190) and a capacitor (191).

3. The device (10) as claimed in claim 1, wherein the passive resonator circuits (19) are arranged so as to cover an entire surface of the ferromagnetic body (14).

4. The device (10) as claimed in claim 1, further comprising a first circuit (17) for matching the resonance frequency of the primary coil (13) to the first charging frequency (F1), and a second circuit (18) for matching the resonance frequency of the primary coil (13) to the second charging frequency (F2), and second routing means (151), the second routing means (151) being furthermore designed to connect/disconnect the primary coil (13) to/from the first matching circuit (17) and to/from the second matching circuit (18).

5. The device (10) as claimed in claim 1, wherein the first charging module (11) is a charging module compatible with the WPC consortium and the second charging module (12) is a module compatible with the A4WP consortium.

6. An automobile vehicle comprising a charging device (10) as claimed in claim 1.

7. A method for charging a mobile terminal by magnetic coupling by means of a charging device (10) as claimed in claim 1, wherein,
   when the mobile terminal is to be charged at the first charging frequency (F1), the primary coil (13) is connected to the first charging module (11) and the sub-set of de-activatable turns (N1) of said primary coil (13) is activated, and
   when the mobile terminal is to be charged at the second charging frequency (F2), the primary coil (13) is connected to the second charging module (12) and the sub-set of de-activatable turns (N1) of said primary coil is disabled.

8. The method as claimed in claim 7, wherein,
   when the mobile terminal is to be charged at the first charging frequency (F1), the primary coil (13) is connected to a first circuit (17) for matching the resonance frequency of said primary coil (13) to the first charging frequency (F1), and
   when the mobile terminal is to be charged at the second charging frequency (F2), the primary coil (13) is connected to a second circuit (18) for matching the resonance frequency of the primary coil (13) to the second charging frequency (F2).

9. The method as claimed in claim 7, wherein, the search for the presence of a mobile terminal to be charged is carried out by means of the primary coil (13) connected to the second charging module (12).

10. The method as claimed in claim 8, wherein, the search for the presence of a mobile terminal to be charged is carried out by means of the primary coil (13) connected to the second charging module (12).

11. The device (10) as claimed in claim 2, wherein the passive resonator circuits (19) are arranged so as to cover an entire surface of the ferromagnetic body (14).

12. The device (10) as claimed in claim 2, further comprising a first circuit (17) for matching the resonance frequency of the primary coil (13) to the first charging frequency (F1), and a second circuit (18) for matching the resonance frequency of the primary coil (13) to the second charging frequency (F2), and second routing means (151), the second routing means (151) being furthermore designed to connect/disconnect the primary coil (13) to/from the first matching circuit (17) and to/from the second matching circuit (18).

13. The device (10) as claimed in claim 3, further comprising a first circuit (17) for matching the resonance frequency of the primary coil (13) to the first charging frequency (F1), and a second circuit (18) for matching the resonance frequency of the primary coil (13) to the second charging frequency (F2), and second routing means (151), the second routing means (151) being furthermore designed to connect/disconnect the primary coil (13) to/from the first matching circuit (17) and to/from the second matching circuit (18).

14. The device (10) as claimed in claim 2, wherein the first charging module (11) is a charging module compatible with the WPC consortium and the second charging module (12) is a module compatible with the A4WP consortium.

15. The device (10) as claimed in claim 3, wherein the first charging module (11) is a charging module compatible with the WPC consortium and the second charging module (12) is a module compatible with the A4WP consortium.

16. The device (10) as claimed in claim 4, wherein the first charging module (11) is a charging module compatible with the WPC consortium and the second charging module (12) is a module compatible with the A4WP consortium.

* * * * *